United States Patent [19]
Swenson

[11] 3,939,464
[45] Feb. 17, 1976

[54] COAXIAL CABLE SENSOR MOUNTING

[75] Inventor: Richard C. Swenson, North Stonington, Conn.

[73] Assignee: The United States of America as represented by the Secretary of the Navy, Washington, D.C.

[22] Filed: Nov. 4, 1974

[21] Appl. No.: 520,501

[52] U.S. Cl. ................. 340/4 R; 340/8 R; 340/8 S; 340/3 T
[51] Int. Cl.² ........................................... H04R 1/44
[58] Field of Search ............ 340/3 T, 8 R, 8 S, 7 R, 340/7 PC, 9, 4 R, 5 R

[56] References Cited
UNITED STATES PATENTS

| | | | |
|---|---|---|---|
| 2,638,176 | 5/1953 | Doolittle | 340/7 R |
| 2,762,032 | 9/1956 | Vogel | 340/8 R X |
| 3,263,768 | 8/1966 | Zepernick | 340/8 R X |
| 3,518,677 | 6/1970 | Florian | 340/7 R |

Primary Examiner—Richard A. Farley
Attorney, Agent, or Firm—Richard S. Sciascia; Arthur A. McGill; Prithvi C. Lall

[57] ABSTRACT

A faired cage, forming part of a sensor array has conical shaped pieces at opposite ends and a plurality of grooved parallel bars secured therebetween. A chamber formed within the parallel bars is suitable for containing a sensor. The cage is utilized in conjunction with a parallel element synthetic strength member electromechanical cable. The conical shaped pieces comprise flexible boots having cavities for containing electrical wires and strength members. This configuration provided on each end of the cage enable the cable to bend smoothly over the cage.

8 Claims, 4 Drawing Figures

U.S. Patent  Feb. 17, 1976  3,939,464
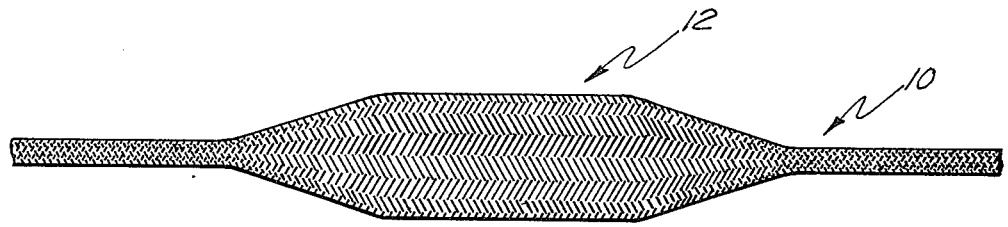
FIG. 1
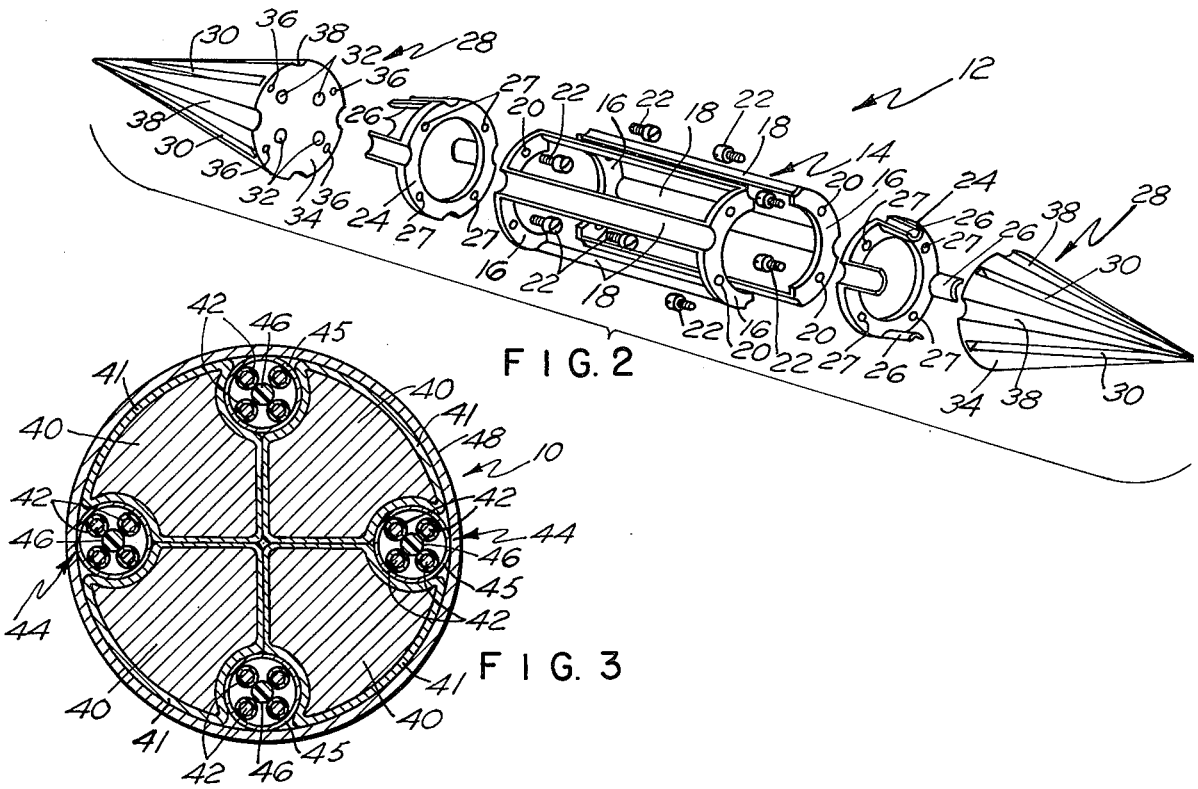
FIG. 2
FIG. 3
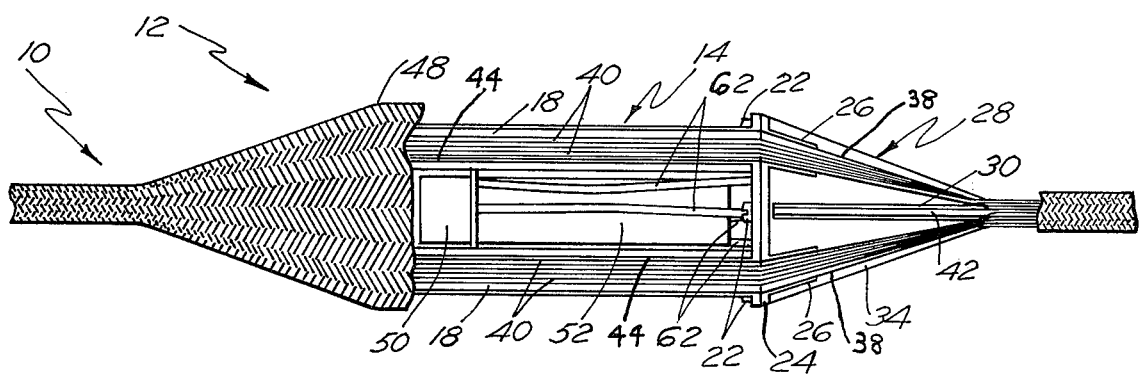
FIG. 4

COAXIAL CABLE SENSOR MOUNTING

STATEMENT OF GOVERNMENT INTEREST

The invention described herein may be manufactured and used by or for the Government of the United States of America for governmental purposes without the payment of any royalties thereon or therefor.

BACKGROUND OF THE INVENTION

The present invention generally relates to sonar systems and more particularly to housings for sensors such as hydrophones in sonar arrays.

Sonar array assemblies comprise of plurality of hydrophones spaced from each other and generally towed from the aft end of a ship or suspended in any altitude in the ocean. The hydrophone may be a passive listening device used primarily for surveillance or scientific application. Additionally hydrophones may be active devices suitable for transmitting as well as receiving acoustic signals.

In the past it has been common for hydrophones to be mounted coaxially in steel cables utilizing various types of brackets. In such an arrangement the steel cable must be cut, all electrical wires remolded and the cable end-fitted on both ends. This hinders deployment and also results in an increase in weight, complexity, noise and cost.

SUMMARY OF THE INVENTION

Accordingly, it is a general purpose and object of the present invention to provide an improved in line acoustic sensor assembly. It is a further object to provide an improved mounting for the sensor. Another object is that the mounting will have bypass grooves for strength members and conductors not connected to the particular sensor within the mounting. This eliminates the requirement to cut these elements. Other objects are that the installation will be small for reduction in weight and improved handling characteristics. These and other objects of the invention and the various features and details of construction and operation will become apparent from the specification and drawings.

The above objects are obtained by providing an in-line mounting suitable for holding the required sensor. The housing is provided with external grooves for holding conductors and strength members so that they may by-pass the sensor within the mounting uninterrupted. In addition means are provided for receiving the conductors associated with the particular sensor. A double conical shape adds to the streamlining and suitability of the array for handling purposes. The interior of the housing itself is cylindrical in shape with the bottoms of the cones forming the walls at either end. A plurality of parallel bars spaced on the circumference of the bottoms of the cones form the sidewalls of the housing.

BRIEF DESCRIPTION OF THE DRAWINGS

FIG. 1 is a view of a line array sensing unit in accordance with the present invention suitable for deployment in an array system;

FIG. 2 is an exploded view of the sensor mount of FIG. 1;

FIG. 3 is a cross-sectional view of the cable of FIG. 1; and

FIG. 4 is a cutaway view of FIG. 1.

DESCRIPTION OF THE PREFERRED EMBODIMENT

Referring now to the figures and particularly to FIG. 1 there is shown a portion of a sonar system. The system includes a synthetic braided parallel element cable 10 which encapsulates sensor mount 12. In the present embodiment the cable has the mount 12 inserted in it, followed by over braiding.

FIG. 2 shows an exploded view of the mount 12 used for housing a sensor such as a hydrophone. The mount 12 has a split cylindrical cage 14 formed by a split ring 16 at either end and four slotted strongbacks 18 connected there between. The split rings 16 have apertures 20 for the insertion of screws 22.

Rings 24 are connected to each end of split ring 16 by means of screws 22. The rings 24 have on their outer circumference, slotted extensions 26 of the strongbacks 18. The split cylindrical cage 14 and rings 24 can be made of stainless steel or other suitable material.

Flexible fairings 28 made of polyurethane are connected at either end to rings 24. The fairings are in the form of slotted conical-shaped boots giving a streamline appearance to the mount 12. The fairings 28 are a solid material and each fairing has eight grooves alternately marked 30 and 38 extending along its lateral surface. Four apertures 32 extend from four of the grooves 30 to the cone's base 34. The purpose of grooves 30 and 38 will be explained later in conjunction with FIG. 4.

FIG. 3 shows a cross-sectional view of cable 10. Four sections of aramid fiber 40, selected for its high strength, low stretch and bending characteristics form the center of cable 10. A covering 41 surrounds each of the fiber sections 40. Sixteen conductors 42 are arranged in quadrature in groups of four conductors 44. The groups of conductors 44 fit within the interstices formed by the sections of fiber 40. Each group of four conductors 44 has its conductors 42 helically wound around an elastic member 46. A covering 45 surrounds each group of conductors 44 and an overall braided covering 48 encloses the cable 10.

Referring now to FIG. 2 and to FIG. 4, there is shown in FIG. 4 the manner in which the cable 10 is fitted with cage 14. A sensor 50 with extended portion 52 may comprise a hydrophone that is inserted within cage 14. Four leads 62 from sensor 50 pass through apertures 32 and connect in a watertight manner with the conductors 42 that form one of the groups of four conductors 44. The connection of leads 62 with conductors 42 may be by means of watertight connectors or a watertight molding over the connection itself. The conductors 42 individually extend down four of the grooves 30. The remaining bundles of conductors 44 and the fibers 40 pass on the outside of cage 12 through grooves 38, extensions 26 and strongbacks 18.

The fibers 40 provide the tensile strength to hold the system together and are not terminated throughout the entire length of cable 10. In addition the system is formed with the required tension to enable fibers 40 to hold mount 12 in place.

The system by providing for the conductors 42 in bundles 44 in unison with fibers 40 along the outer surface of mount 12 enable the conductors 42 to be terminated only at the individual sensor 50 for which they are intended.

In manufacture the cable 10 is completed without mount 12 or sensor 50 inserted. The jacket 48 of the cable is then cut and the mount 12 with sensor 50 is inserted. The connection of appropriate wires 42 and the proper alignment in grooves 38, extension 26 and strongback 18 of fibers 40 and remaining wires 42 is then made. The jacket 48 is then rebraided or served with yarn to give the appearance as shown in FIG. 1.

The above system provides an economical streamlined sensor system. Further advantages are that when this system is utilized the multi-system array in which it is used will show an increase in performance both from the quality of data and deployment ease. In addition the invention provides a more reliable system and when not in use can be easily coiled.

It will be understood that various changes in the details, materials, steps and arrangement of parts, which have been herein described and illustrated in order to explain the nature of the invention, may be made by those skilled in the art within the principal and scope of the invention as expressed in the appended claims.

What is claimed is:

1. A sensor mount comprising:
   a sensor cage having a cylindrical shape with a split ring at both ends and a plurality of grooved strongbacks connected there between; and
   conically shaped flexible fairings connected at both ends of said sensor cage and each of said fairings having grooves aligned with the strongback grooves and at least one additional groove having an aperture at the base of said fairing.

2. A sensor mount according to claim 1 further comprising a pair of rings with each ring mounted at opposite ends of said cage between said cage and said fairing, said rings having a plurality of grooved extensions of said strongback adapted to be inserted in said fairing grooves.

3. A sensor mount according to claim 2 wherein said plurality of grooved strongbacks are four in number and are arranged in quadrature on the circumference of said cylindrically shaped sensor cage.

4. A line array sensing system comprising:
   a sensor mount including a sensor cage having a cylindrical shape with a split ring at both ends, a plurality of grooved strongbacks connected therebetween, and a pair of conically shaped flexible fairings connected at each end of said sensor cage, each of said pair of fairings having grooves aligned with the strongback grooves and at least one additional groove having an aperture at the base of said fairing;
   a sensor mounted in said sensor cage, said sensor having a plurality of leads extending through said one additional groove; and
   a cable having a first and second plurality of conductors and a plurality of strength members with each of said first plurality of conductors connected respectively to one of said plurality of leads, said cable being axially aligned with said sensor mount and having said second plurality of conductors and said plurality of strength members inserted in respective grooves of said strongbacks and fairings.

5. A line array sensing system according to claim 4 wherein said cable further comprises a covering enclosing said sensor mount.

6. A line array sensing system according to claim 5 wherein said sensor mount further comprises a pair of rings with each ring mounted at opposite ends of said cage between said cage and said fairing, said rings having a plurality of grooved extensions of said strongback adapted to be inserted in said fairing grooves.

7. A line array sensing system according to claim 6 wherein said plurality of grooved strongbacks are four in number and are arranged in quadrature on the circumference of said cylindrically shaped sensor cage.

8. A line array sensing system according to claim 7 wherein said cable further comprises:
   a plurality of aramid fiber sections having instices formed therebetween;
   a plurality of conductor bundles arranged in quadrature and located within the interstices of said fibers; each of said bundles having an elastic members on which said conductors are helically wound; and
   a jacket enclosing said fiber sections and said conductors.

* * * * *